Dec. 13, 1960  E. P. RAJU  2,964,733
AUTOMOBILES OR LIKE VEHICLES FITTED WITH
THEFT PREVENTION DEVICES
Filed April 9, 1958  7 Sheets-Sheet 1
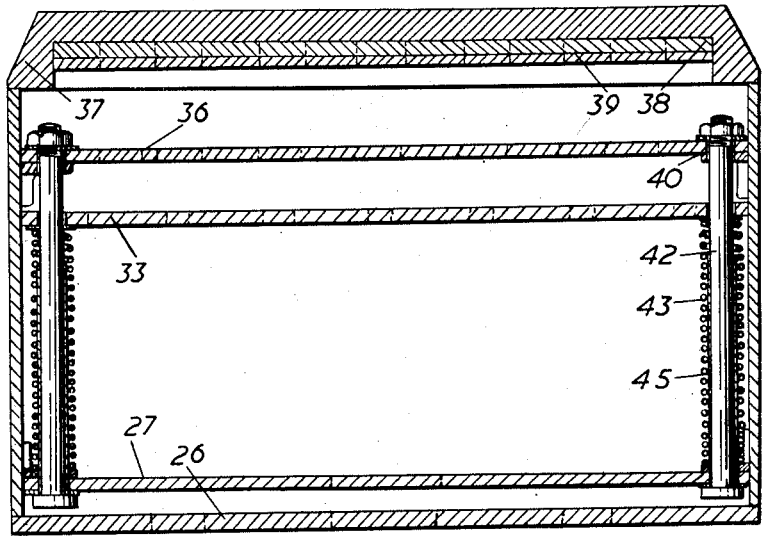
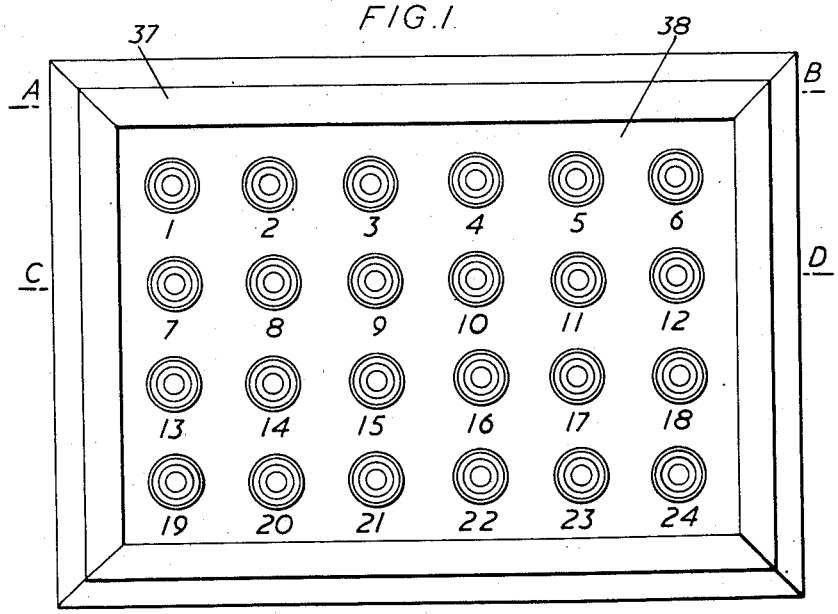
Inventor
Edward Percival Raju
By
Michael S. Striker
Attorney Dec. 13, 1960

E. P. RAJU 2,964,733

AUTOMOBILES OR LIKE VEHICLES FITTED WITH
THEFT PREVENTION DEVICES

Filed April 9, 1958

Inventor
Edward Percival Raju
By
Michael S. Striker
Attorney

Dec. 13, 1960 E. P. RAJU 2,964,733
AUTOMOBILES OR LIKE VEHICLES FITTED WITH
THEFT PREVENTION DEVICES
Filed April 9, 1958 7 Sheets-Sheet 3
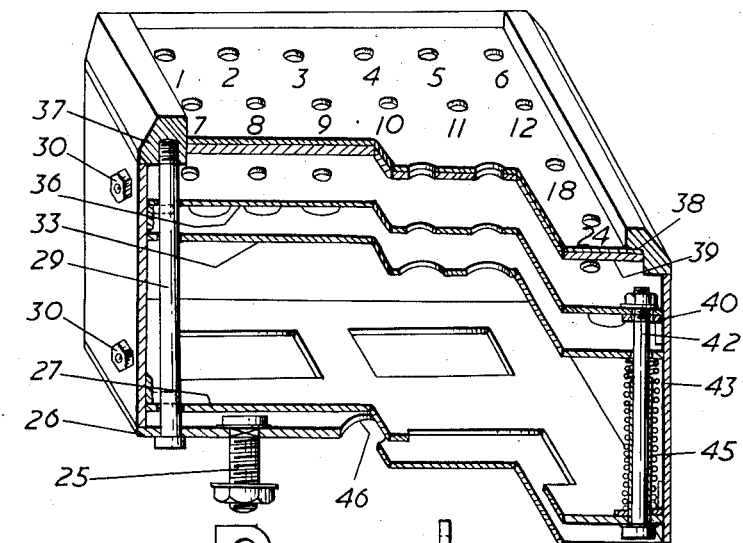
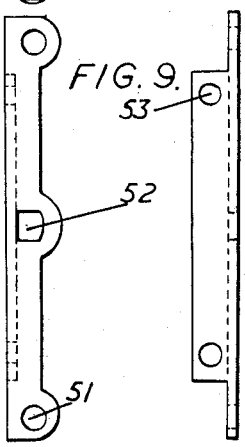
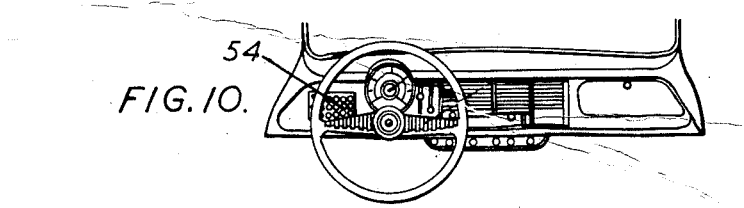
Inventor
Edward Percival Raju
By
Michael S. Striker
Attorney Dec. 13, 1960 E. P. RAJU 2,964,733
AUTOMOBILES OR LIKE VEHICLES FITTED WITH
THEFT PREVENTION DEVICES
Filed April 9, 1958 7 Sheets-Sheet 4

Inventor
Edward Percival Raju
By
Michael S. Striker
Attorney

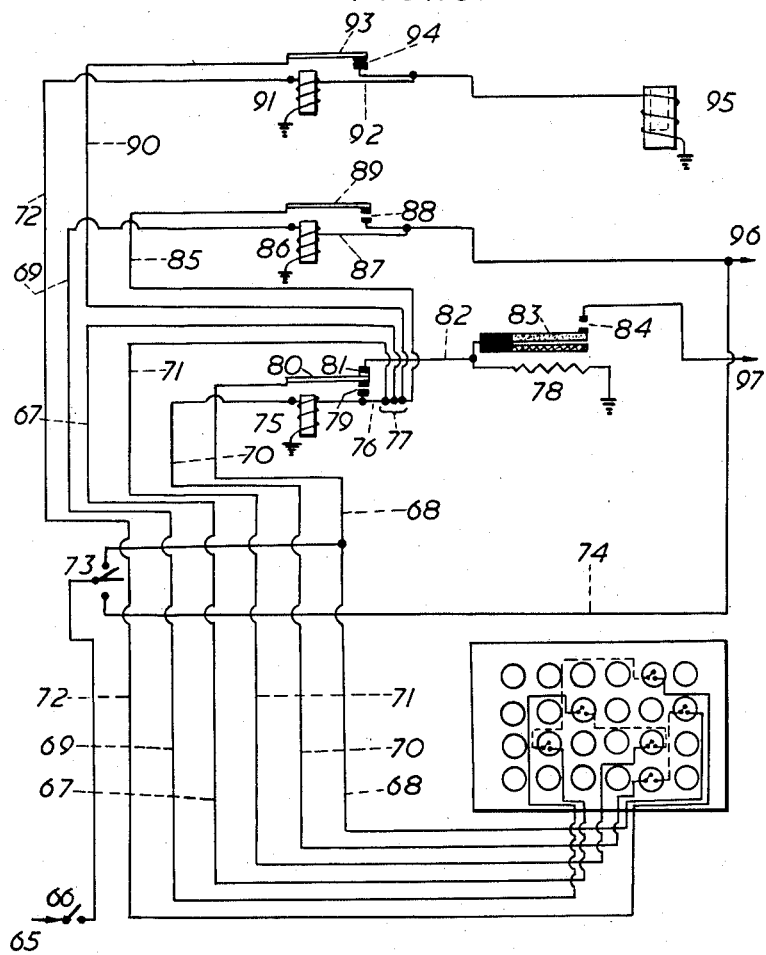

Dec. 13, 1960   E. P. RAJU   2,964,733
AUTOMOBILES OR LIKE VEHICLES FITTED WITH
THEFT PREVENTION DEVICES
Filed April 9, 1958   7 Sheets-Sheet 6
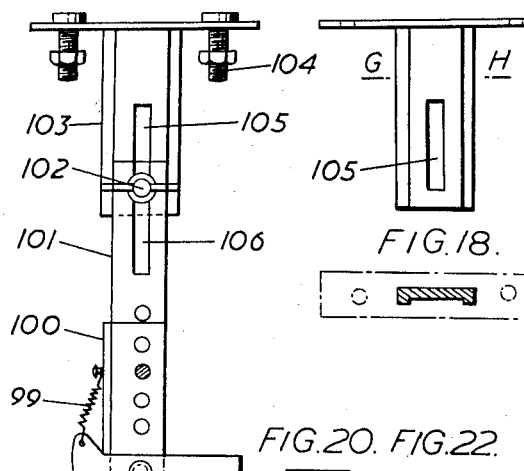
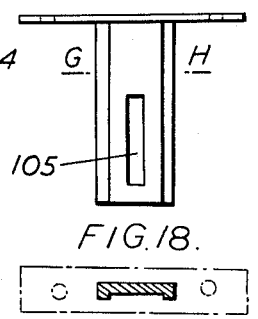
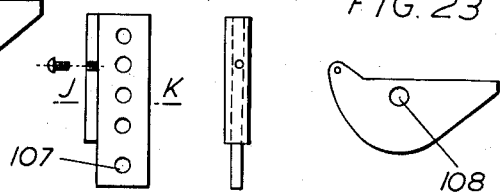
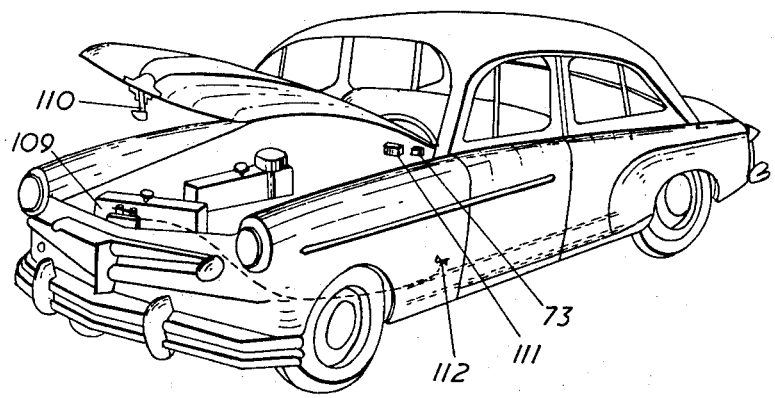
Inventor
Edward Percival Raju
By
Michael S. Striker
Attorney

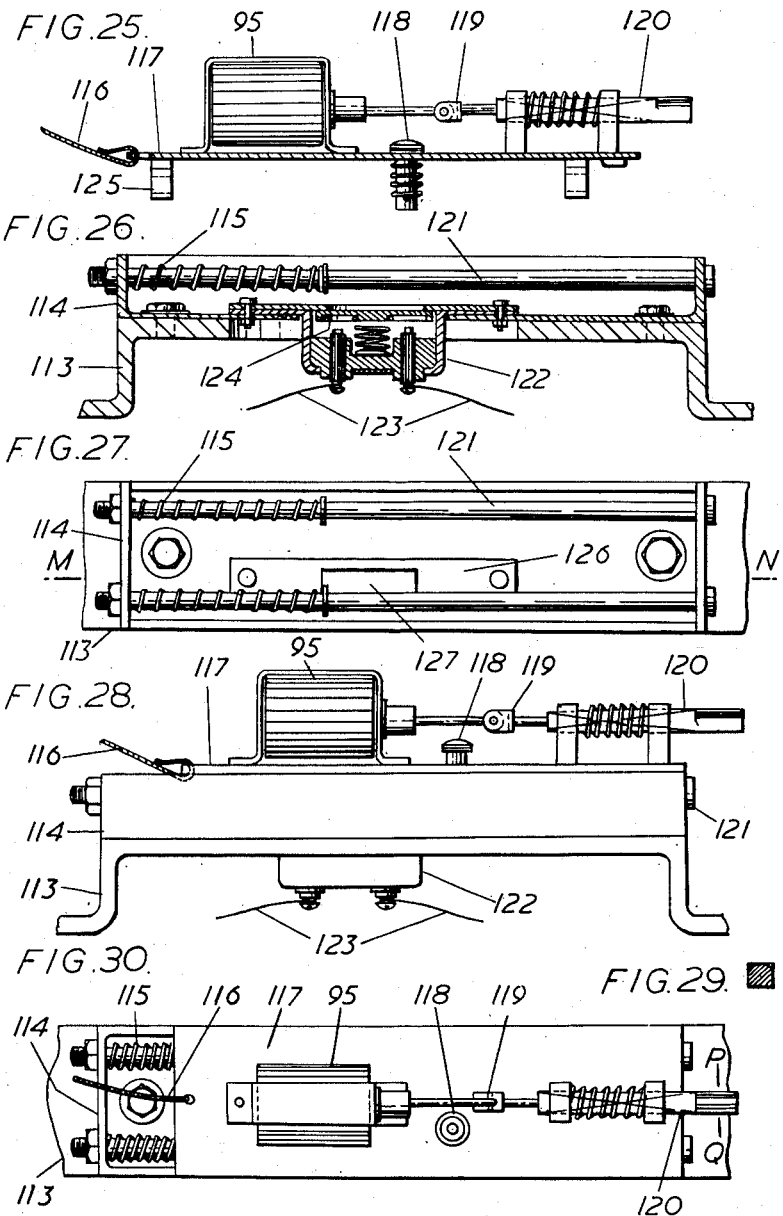

2,964,733

AUTOMOBILES OR LIKE VEHICLES FITTED WITH THEFT PREVENTION DEVICES

Edward Percival Raju, Andhra State, India (% Small Industries Service Institute, 20 Rutland Gate Cathedral P.O., Madras 6, India)

Filed Apr. 9, 1958, Ser. No. 727,297

11 Claims. (Cl. 340—63)

This invention relates to automobiles or like vehicles fitted with theft prevention devices.

At present various devices exist which have been designed with the intention of providing security to automobiles and like motor vehicles. These devices invariably comprise some type of ignition lock whereby the ignition circuit is operated by means of a metal key. As such a key is so easily liable to be lost, stolen or duplicated the degree of security provided by such devices is definitely not complete. Further, the very purpose for which such devices have been designed, namely, to operate the ignition circuit by means of the ignition lock, can be so easily defeated by merely opening the hood and connecting the battery terminal directly to the high voltage or high tension coil, and thereby nullifying the degree of security provided by the ignition lock. This act of connecting the battery terminal temporarily to the coil direct is an extremely simple operation that can be done in a few minutes and so stealthily indeed as not to attract any undue attention. This is particularly so as under present day conditions in which the parking of thousands of vehicles in the open, due to the lack of adequate covered accommodation, would appear to offer a great temptation to any potential automobile thief.

This invention has been particularly designed to provide a positive theft prevention device whereby a complete degree of security is afforded for automobiles and like type of motor vehicles, and it is based on a recognition of the fact that such a theft preventing device should satisfy the following requirements, namely, (i) that the closing energisation of the ignition circuit should depend not only on the use of the ignition key, but also on the operation of a control which will not be apparent to any unauthorized person;

(ii) that it should prevent the opening of the engine hood by any unauthorized person; and (iii) that if an attempt is made by any unauthorized person either to use the ignition key for starting the engine, or to open the engine hood for the same purpose, it should sound an effective alarm.

Based on a recognition of these facts, this invention, in its most general aspect consists of an automobile or like vehicle in which the closing of the ignition circuit is under the control, not only of an ignition key but also of two or more specific predetermined push buttons of a large number of push buttons arranged in a device hereinafter referred to as the Master Control.

In order to prevent an unauthorized person from finding out the aforesaid specific push buttons which should be pressed for closing the ignition circuit, the tops of all the push buttons provided on the said Master Control are made identical in appearance so that they could be distinguished from one another only with reference to their respective positions in relation to one another, which positions besides not being visually indicated can also be changed from time to time in any arbitrary manner desired by the owner of the automobile or like vehicle.

In an automobile or like vehicle having a theft preventing device as described above, provision may be made to ensure that the initial act of merely switching on the ignition key will automatically cause the horns to sound in approximately 10 seconds or so, and will cause them to keep on sounding until the ignition key is switched off, or until a specific pair out of the aforesaid push buttons of the Master Control is pressed.

To provide an effective alarm sounding device for the purpose mentioned, a simple electrically operated bi-metallic type of thermostat may be wired to the ignition circuit and the flow of current from the ignition circuit to the said electrically operated thermostat may be controlled by the aforesaid pair of push buttons provided in the Master Control.

The ignition circuit may be controlled not only by the aforesaid pairs of push buttons but also by two relay coils which are operated by the aforesaid specific push buttons of the Master Control.

An automobile or like vehicle fitted with a theft prevention device as described, may also be provided with an electrically operated hood locking device which may be designed to function independently of any other type of lock fitted on the vehicle, the said electrically operated hood lock being under the control of a third relay coil and another specific pair of push buttons provided in the said Master Control.

The said hood locking device may also be provided with a steel cable or like means whereby in an emergency it can be opened independently of the electrical controls for operating it.

As a safeguard against the operation of the said emergency means of opening the hood lock by unauthorized persons, the said emergency means may be provided with a device which will cause the horns to sound immediately the said means are operated.

In a preferred embodiment of this invention, the said Master Control is a metal box-like device of convenient size to enable it to be installed either in the instrument panel of the vehicle or to be mounted on a special bracket which can be attached to the steering column, and in such a manner that it is within easy reach of the driver. It is provided with a multiplicity of push buttons, made of plastic or like material. A convenient number will be 24 push buttons which may be arranged in four horizontal rows of six each. It is to be understood, however, that the number of such buttons may be increased or decreased without departing from the principle and design of this invention.

Only the heads of these push buttons are exposed to view through the top cover plate of the Master Control and as these heads are identical in appearance, none of the said buttons can be distinguished from one another when assembled into position.

The holes in the said top cover plate, which may be of plastic or like material, through which the heads of these 24 buttons protrude may be either serially numbered from 1 to 24 or lettered from A to Z excluding the letters I and O. Of these 24 push buttons 18 have broad bases and the remaining 6 have narrow bases. The respective positions of each of these 24 buttons can be readily interchanged, as often as desired, with the intention of altering the specific locations of the 6 narrow based buttons with relation to their 18 broad based counterparts. Immediately below the said top plastic cover plate, and in contact with it, may be provided a thin steel plate to strengthen the top plastic cover plate and reinforce it against breakage by rough handling.

The Master Control is provided with six contact holder assemblies each consisting of a strong metal frame with a moulded Bakelite holder for two brass contact segments on which the terminals of the wires for any particular circuit are attached.

Each of the said contact holder assemblies is firmly attached to a floating plate by a screw adapter and is prevented from getting loose by means of two locking wires which pass through the small conveniently spaced holes along the lower edge of the screw adapter and then fixed to the upper part of the metal frame of the contact holder assembly. These contact holder assemblies are so located that the bases of the aforesaid narrow based push buttons are immediately above and almost touching the plungers of the respective contact holder assemblies. The relative locations of these six contact holder assemblies can also be readily changed, as often as desired, to correspond with any alteration in the location of the six narrow based push puttons for operating the respective circuits.

When the two specific buttons which operate a particular circuit are momentarily pressed the tapered conical sides of the plunger ends touch the brass contact segments to which the wire terminals are attached, and thereby complete that particular circuit. The pressing of one or more additional buttons, or even all the remaining ones for that matter, with the intention of achieving this purpose will not be effective as it would only cause the floating plate, to which the contact holder assemblies are attached, to be depressed and thereby prevent the required contact being made to complete the circuit.

If the floating plate is forced down, it will rest on the four metal sleeves placed inside the four corner springs. The effect of pressing down the floating plate would be that no circuit can be completed even when the correct buttons are pressed; and this condition would remain as long as the floating plate remains depressed.

The said electrically operated hood locking device may comprise a steel bolt which can be retracted by an electric solenoid to which it is attached by means of a knuckle or U joint so as to ensure that any upward or downward movement of the bolt, no matter however insignificant, that may be caused each time the hood is closed will not affect the solenoid in any way.

These and other features of this invention will now be more particularly described with reference to the accompanying drawings, in which:

Fig. 1 is a plan view of an embodiment of the Master Control of the present invention;

Fig. 2 is a cross section on line A—B of Fig. 1;

Fig. 7 is a perspective view of the embodiment of the Master Control of Fig. 1, partly in section;

Fig. 8 is a plan view of an embodiment of one of the detachable brackets which secure together the guide plate, the floating plate and the baffle plate of the Master Control;

Fig. 9 is a side elevation of the embodiment of the detachable bracket of Fig. 8;

Figure 11:
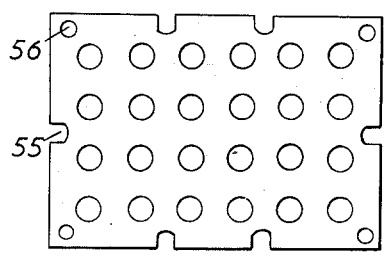
Figure 12:
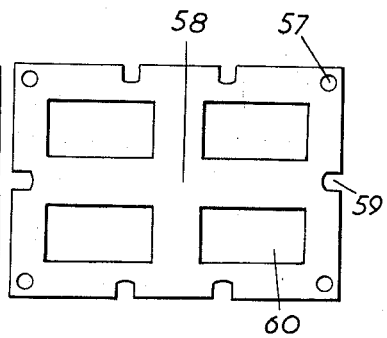
Figure 13:
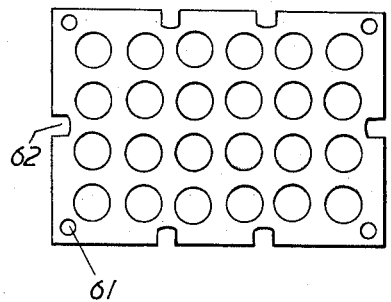
Figure 14:
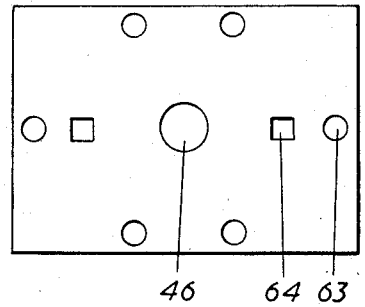

Fig. 10 indicates a location of the Master Control on the instrument panel of an automobile or like vehicle;

Fig. 11 is a plan view of an embodiment of the guide plate of the Master Control;

Fig. 12 is a plan view of the embodiment of the baffle plate of Fig. 8 of the Master Control;

Fig. 13 is a plan view of an embodiment of the floating plate of Fig. 8 provided in the Master Control;

Fig. 14 is a plan view of an embodiment of the base plate of the Master Control;

Fig. 15 is a schematic wiring diagram of an embodiment of the theft prevention device of the present invention;

Fig. 16 is a front elevation of an embodiment of the drop arm of the electrically operated hood lock assembly;

Fig. 17 is a front elevation of the upper part of the embodiment of the drop arm of Fig. 16 of the hood lock assembly;

Fig. 18 is a cross section on line G—H of Fig. 17;

Fig. 19 is a front elevation of the center of the embodiment of the drop arm of Fig. 16 of the hood lock assembly;

Fig. 20 is a front elevation of the lower part of the embodiment of the drop arm of Fig. 16 of the hood lock assembly;

Fig. 21 is a cross section on line J—K of Fig. 20;

Fig. 22 is a side elevation of the lower part of the drop arm of Fig. 20;

Fig. 23 is a front elevation of the locking piece of the embodiment of the drop arm of Fig. 16 of the hood lock assembly;

Fig. 24 illustrates an approximate position of the drop arm and hood lock assembly in a vehicle;

Fig. 25 is a front elevation of an embodiment of the electric solenoid and the steel bolt mounted on the sliding plate of the hood lock;

Fig. 26 is a sectional elevation on line M—N of Fig. 27;

Fig. 27 is a plan view of an embodiment of only the base plate assembly of the hood lock;

Fig. 28 is a front elevation of an embodiment of the complete hood lock assembly;

Figure 29 is a cross section on line P—Q of Fig. 30 of only the steel bolt of the lock; and Figure 30 is a plan view of an embodiment of the complete hood lock assembly.

The theft prevention device illustrated in the drawings has for its main parts a Master Control, a hood locking arrangement and the layout of the various electric circuits under the control of the said Master Control.

The Master Control has for its main parts (i) a set of 24 push buttons; (ii) six contact holder assemblies; (iii) a floating plate to which the said contact holder assemblies are attached; (iv) means which enable the said contact holder assemblies to function when, and only when, the specific pairs of push buttons are pressed; and (v) a metal box-like device in which the parts above mentioned are housed.

Figure 3:
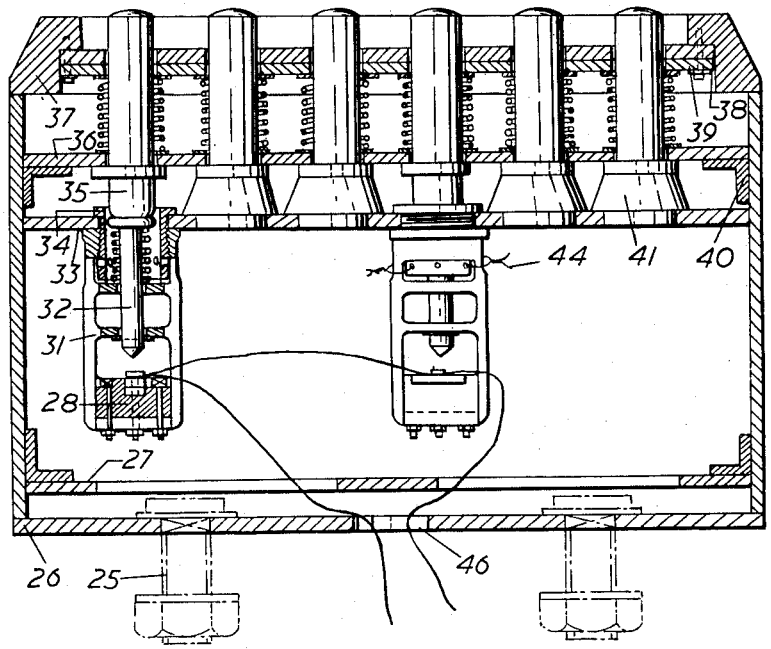
Fig. 3 is a cross section on line C—D of Fig. 1.
Figure 4:
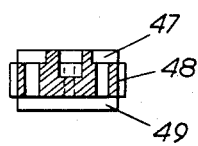
Fig. 4 is a cross section on line E—F of Fig. 5.

The said 24 push buttons provided on the Master Control are arranged in four horizontal rows of six each. It is to be understood, however, that the number of such buttons may be increased or decreased without departing from the principle and design of this invention. Of these 24 push buttons, 18 have bases of approximately 1" diameter, as shown at 41 on Fig. 3, and the remaining 6 have bases of approximately ½" diameter, as shown at 35.

As, however, only the heads of those push buttons are exposed to view, and as these heads are identical in appearance, none of the said 24 buttons can be distinguished from one another when assembled into position. The holes in the top cover plate 38, which is made of plastic or like material, and through which the heads of the said 24 buttons protrude, are serially numbered from 1 to 24.

Alternatively, the holes may be lettered from A to Z excluding the letters I and O. The respective positions of each of the said 24 buttons can be readily interchanged, as often as desired, for the purpose of altering the specific locations of the 6 narrow based buttons 35 with relation to their 18 broad based counterparts 41. Immediately below the top plastic cover plate 38, and in contact with it, is a thin steel plate 39 to strengthen the top plastic cover plate and reinforce it against breakage by rough handling.

Figure 6:
Fig. 6 is a plan view of an embodiment of the brass contact segment.

Each of the six contact holder assemblies provided on the Master Control consists of a strong metal frame 31 with a moulded Bakelite holder 28 for two brass contact segments (Figure 6) on which the terminals of the wires for any particular circuit may be attached. The said moulded Bakelite holder 28 is approximately 1" in diameter and has a groove 48 approximately ¼" wide cut at the sides diametrically opposite and extending along the bottom 49. This groove enables the moulded Bakelite holder 28 to be firmly seated on the frame 31 of the contact holder assembly.

Figure 5:
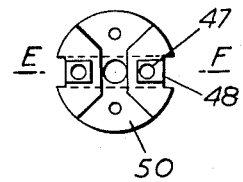
Fig. 5 is a plan view of an embodiment of the moulded Bakelite holder of the contact holder assemblies.

The top of the moulded Bakelite holder 28 is recessed at the portions shown at 50 in Fig. 5 to a depth of approximately ¼" and to the shape of the brass contact segment; thus enabling the 2 brass contact segments to be embedded flush with the top surface of the Bakelite holder 28. The brass contact segment is a flat piece of brass approximately ¼" thick and of the particular size and shape shown. The wider fan shaped portion of this segment is meant to provide the required surface on which the respective circuit terminal can be firmly screwed. The two square holes 47 of Fig. 5 are also recessed in the top of the moulded Bakelite holder to a depth of approximately ¼" so as to ensure that the square heads of the two bolts securing this Bakelite holder to the frame of the assembly are not only held firmly, and prevented from rotating, but are also embedded flush with the top surface of the Bakelite holder and thus insulated from the two brass contact segments.

The said contact holder assemblies are securely attached to a floating plate 33. Each of the contact holder assemblies is firmly attached to the floating plate 33 by means of a screw adapter 34 and is prevented from getting loose by means of the two locking wires 44.

These wires 44 pass through the small conveniently spaced holes along the lower edge of the screw adapter 34 and then fixed to the upper part of the metal frame 31 of the contact holder assembly. These contact holder assemblies are so located that the said six narrow based buttons 35 are immediately above and almost touching the plungers 32 of the respective contact holder assemblies. The relative locations of these six contact holder assemblies can also be readily changed, as often as desired, to correspond with any alteration in the location of the six narrow based push buttons 35 for operating the respective circuits.

When the two specific buttons to operate a particular circuit are momentarily pressed the tapered conical sides of the plunger ends touch the brass contact segments to which the wire terminals are attached, and thereby complete that particular circuit. The pressing of one or more additional buttons, or even all the remaining ones for that matter, with the intention of achieving his purpose will not be effective as it would only cause the floating plate, to which the contact holder assemblies are attached, to be depressed and thereby prevent the required contact being made to complete the circuit.

If the floating plate is forced down it will rest on the four metal sleeves 45 of Figures 2 and 7 placed inside the four corner springs 43 of Figures 2 and 7. The effect of pressing down the floating plate would be that no circuit can be completed even when the correct buttons are pressed; and this condition would remain as long as the floating plate remains depressed.

The floating plate 33 to which the contact holder assemblies are attached, is made of aluminium or any light alloy metal approximately 7" by 5" and approximately ⅛" thick. It has 24 holes of ¾" diameter, to any 6 of which the 6 contact holder assemblies can be attached. There are 4 holes 61 of Fig. 13 approximately 5/16" in diameter, in the four corners for the four bolts 42 of Figs. 2 and 7. In addition, six slots 62 of Fig. 13 each approximately ⅜" wide, are provided to enable the six long fixing bolts 29 of Fig. 7 to pass through from the base plate 26 to the top locking frame 37. As the floating plate 33 is free to move upwards or downwards the tension of the four corner springs 43 pushes this plate upwards till it touches the bases of the 18 broad based push buttons. The pressing of any one or more of these broad based buttons would therefore cause the floating plate to be lowered taking down with it all the six contact holder assemblies and thereby prevents any of the circuits from being completed.

The guide plate 36, which is above the floating plate 33 is a steel plate approximately 7" by 5" and approximately ⅛" thick. It is provided with 24 holes approximately 9/16" in diameter through which the stems of the 24 push buttons pass. Four holes 56, of Fig. 11 each approximately 5/16" in diameter, are provided for the four corner bolts 42. In addition six slots 55, each approximately ⅜" wide, are provided to enable six long fixing bolts 29 to pass through from the base plate 26 to the top locking frame 37. As each of the 24 push buttons is spring loaded, the tension of the springs would ensure that the heads of the buttons remain fully rasied upwards and approximately ⅜" above the surface of the top plastic cover plate. When any push button is pressed, the downward movement of that button would be guided by the travel of the stem of that push button through the hole in the top plastic cover plate 38, the hole in the steel plate 39 immediately below, and the hole in the guide plate 36. Thus the pressing of any one of the six narrow based buttons would definitely ensure that the respective plunger 32 immediately below is also pushed down till its bottom conical tapered end makes the required contact with the two brass contact segments on the moulded Bakelite holder.

When the pressure on the said push button is released, it would immediately return to its normal raised position as before.

Below the floating plate 33 there is the baffle plate 27. This is a steel plate approximately 7" by 5" and approximately ⅛" thick, and it has four rectangular cut-away portions 60, as shown in Fig. 12, which thereby provide a central metal strip 58, approximately 1" wide both along the length and breadth of the plate. There are 4 holes 57 in the floating plate of Fig. 12 approximately 5/16" in diameter in the four corners for the four corner bolts 42. There are six slots 59, each approximately ⅜" wide, to enable the six long fixing bolts 29 to pass through from the base plate to the top locking frame. This baffle plate serves a two-fold purpose; namely, the four rectangular cut-away portions provide a passage for the various circuit wires to the respective contact holder assemblies immediately above, and the central longitudinal strip approximately 1" wide ensures that the two securing bolts 25 are retained in position at all times, thereby ensuring that these bolts are not pushed inwards or even rotate at the time of either loosening or tightening the nuts of these bolts.

The guide plate 36, the floating plate 33 and the baffle plate 27 are secured together by means of the four corner bolts 42, which are attached to four detachable L shaped angle brackets 40, two on each side, and fixed to the sides of the Master Control. As shown in Figs. 8 and 9, the bracket 40 is flat at the two ends so as not to impede in any way the positioning of four springs 43 and the four corner bolts 42 which pass through the two holes 51 (Fig. 8), one at each end of the bracket 40. The slot 52 in the center of the bracket is intended for the long fixing bolts 29 which pass through the Master Control from the base plate 26 at the bottom and are screwed into the top locking frame 37. The two holes 53 at the side of the bracket 40 are for the bolts 30 by which the said bracket is firmly secured to the sides of the Master Control. The guide plate 36 and the baffle plate 27 are securely attached to the side detachable L shaped angle brackets 40 and the floating plate 33 is free to move up and down. The tension of the four corner springs 43 forces the floating plate 33 upwards and against the bases of the 18 broad based push buttons 41; so that the pressing of any one or more of these 18 broad based buttons 41 would cause the floating plate 33 to be depressed.

The downward movement of the floating plate 33 is limited to approximately ⅜ inch, for if this plate is forced down any further it will rest on the four metal sleeves 45 placed inside the four corner springs 43. This prevents damage to the moulded Bakelite holders 28 should the floating plate 33 be forced down by pressing the wrong push buttons.

At the bottom of the Master Control is the base plate

26. This is a steel plate approximately 7⅜″ by 5¼″ and approximately 3/16″ thick. In the center of this plate there is a hole 46 (Fig. 14) approximately 1″ in diameter through which pass all the wire terminals for the various electrical circuits that are operated by the Master Control. There are two square holes 64 in the base plate (Fig. 14) approximately ½″ in size on each side of the circular hole 46 in the center. These square holes 64 are provided for the two securing bolts 25, and as these bolts 25 also have square stems they are firmly locked in position in their respective holes, thus ensuring the easy fixing or removal of the Master Control whenever necessary. There are in addition six holes 63 approximately 7/16″ in diameter for the six long fixing bolts 29 which are screwed into the top locking frame and thereby hold the entire Master Control assembly firmly together.

The metal box-like device in which the above mentioned parts are housed is of a convenient size to enable it to be installed either in the instrument panel of the vehicle or to be mounted on a special bracket which can be attached to the steering column, and in such a manner that it is within easy reach of the driver.

The electrically operated hood lock is a locking device which can be installed on any automobile or like type of motor vehicle, and is designed to function independently of any existing type of lock which may already be fitted to the vehicle. The presence or absence of any other type of locking device on the vehicle will not in any way affect the positive action of this lock.

The lock assembly comprises a steel bolt 120 (Figs. 25, 28 and 30) which is approximately 2″ long and approximately ⅜″ square in form along its entire length except for the last half inch where its upper portion is rounded off as shown in Fig. 29 which is a cross section of the bolt 120 on line P—Q of Fig. 30.

This bolt 120 is retracted by an electric solenoid 95 to which it is attached by means of a knuckle or U joint 119 so as to ensure that any upward or downward movement of the bolt 120, no matter however insignificant, that may be caused each time the hood is closed, will not affect the solenoid in any way. As the steel bolt 120 is square in form along its length, it cannot turn around its own axis and thereby disturb the setting of the said U joint 119. Both the bolt 120 and the solenoid 95 are firmly fixed to a sliding plate 117 which is mounted on four strong legs 125 (Fig. 25). These legs 125 are attached to long bolts 121 (Figs. 26 and 27) in such a manner that they can slide along the length of the said bolts. The said bolts 121 are in turn secured to a base plate 114 fixed to a suitable bracket 113 located between the radiator of the engine and the front grille. If, however, the hood is hinged at its front end then the said bracket 113 is attached to the dash board instead. Two strong springs 115 hold the lock assembly in the forward position (Figs. 26, 27 and 28). The approximate position of the said lock assembly in the case of a vehicle where the hood is hinged at the rear is shown at 109 of Figure 24.

To the underside of the hood and towards its front end is attached an adjustable drop arm a front elevation of which is shown in Figure 16. If, however, the hood hinged at its front end, the drop arm is attached to the rear end of the hood instead. The approximate position of the drop arm in the case of a conventional type of hood fixture hinged at the rear is shown at 110 of Figure 24. The drop arm comprises three main parts; namely an upper part 103, a center part 101 and a lower part 100. To the lower part 100 is attached a locking piece 98. The overall length of the drop arm is so adjusted that with the upper and center parts, 103 and 101 respectively, fully extended, the upper edge of the locking piece 98 just engages with the steel bolt 120 of the lock, when the hood is fully lowered to the closed position.

The form and design of the various parts of the adjustable drop arm are individually described below so as to explain their operation.

The upper part 103 of the drop arm (Fig. 17) is approximately 1¾″ long and 1″ wide. It is not flat but U shaped in form as shown in Fig. 18 which is a cross section of Figure 17 on line GH.

In the center of the upper part of the drop arm, and towards its lower end there is a slot 105 approximately 1″ long. This slot 105 is intended to enable a bolt to pass through for the winged butterfly nut 102 by means of which the upper part 103 of the drop arm, is attached to the center part 101 which is to be described below. Due to the form of this upper part 103 it has two side flanges which permit the center part 101 to move only up or down and not side ways. The center part 101 can therefore be raised or lowered and fixed at any desired position by means of the winged butterfly nut 102. At the top of this upper part 103 are two bolts 104 by means of which the drop arm is securely attached to any suitable type of bracket which can be welded or bolted to the underside of the engine hood.

The center part 101 of the drop arm (Fig. 19) is a flat piece of steel approximately 2¾″ long and ¾″ wide. At its upper end there is a slot 106 approximately 1″ long for the bolt and winged butterfly nut by means of which this center part 101 is attached to the upper part 103 but can be raised or lowered to the extent required. Towards the lower end of this center part 101 there are four holes evenly spaced by means of which the lower part 100 of the drop arm can be fixed at any desired position.

The lower part 100 of the drop arm (Fig. 20) is approximately 1¾″ long and ⅞″ wide. The form of this part is not the same throughout its entire length as it is T shaped for approximately 1¼″ of this length as shown in Figure 21 which is a cross section of Figure 20 along line JK and it is flat at its lower end as shown in Figure 22. There are four evenly spaced holes in this part to correspond to four similarly spaced holes in the center part. By means of these four holes this lower part can be fixed to the center part at any desired position. There is in addition another hole 107 right at the bottom which is provided for the rivet or bolt by means of which the locking piece 98 is fixed to this lower part 100. The flanges of the T which extend along 1¼″ of its length serve two purposes. Firstly, the rear flange of the T ensures that the lower part remains fixed in position and cannot move sideways when attached to the center part by means of only one bolt located in any one of the four holes provided as shown in Fig. 16. Secondly, the front flange of the T permits the locking piece to turn clockwise only up to the extent imposed when the upper portion of the rear half of this locking piece comes in contact with the flange as shown in Figure 16.

The locking piece 98 of the drop arm (Fig. 23) is a flat piece of steel of the approximate shape and size shown. It is of sufficient thickness, not less than ¼″, to serve the purpose for which it is intended. In approximately the center of this locking piece is a hole 108 for the bolt or rivet by which it is attached to the lower part of the drop arm. Although the locking piece can pivot around the bolt or rivet as its axis, the spring 99 (Figure 16) pulls it clockwise until it impinges against the forward flange of the lower part of the drop arm as shown in Figure 16. Beyond this point, the locking piece cannot be turned in a clockwise direction.

In the event of any failure in the circuit the lock can be opened by the entire assembly itself being drawn back by means of a steel cable 116 (Figs. 25, 28 and 30). As the lever 112 (Fig. 24) to operate this cable is located at the underside of the vehicle, and attached to the chassis frame, this release lever can be manipulated only by the operator either getting under the vehicle or raising it on a ramp. As a safeguard against any unauthorized person operating this emergency release lever 112 for the hood lock, a press switch 122 (Figs. 26 and 28) to the auxiliary circuit 123 of the horns is provided.

Whenever the lock is drawn back by operating this emergency release lever 112, the spring catch 118 (Figs. 25 and 28) specially provided for this purpose will also be moved back until it drops in the slot 127 (Fig. 27) of the top plate 126 of the press switch thereby causing the lower end of the spring catch 118 to press on the contact plate 124 (Fig. 26) of this press switch of the auxiliary horn circuit. When this happens the horns will sound continuously. As this spring catch 118 is pushed down by means of a strong spring it will cause the horns to sound continuously until such time as the said spring catch is released by being lifted up and thereby permitting the two strong springs 115 in the rear of the base plate to push the entire lock assembly forward to its normal position as shown in Figure 28. In order not to impede in any way the retraction of the steel bolt of the lock by the solenoid this spring catch is located to one side and not along the central longitudinal axis, as shown in Figure 30.

The hood lock has been so designed that any unauthorized person cannot open the engine hood in order to temporarily connect the battery terminal direct to the high voltage coil and thereby start the engine without having to operate the ignition lock and the Master Control, or to tamper with the horn circuit so as to render the alarm sounding device ineffective.

Since the hood lock can only be opened by operation of the Master Control any unauthorized person who may attempt to open the hood lock would himself cause the alarm sounding device to function and would be unable to open the hood. Even if he resorts to opening the hood by means of the emergency release 112 located on the underside of the vehicle, he would still cause the horns to sound continuously for sufficient time to draw attention towards the vehicle.

The wiring diagram of Fig. 15 illustrates the various electrical circuits that are controlled by the operation of the Master Control. The three relay coils of the Master Control and the five main circuits shown in this wiring diagram are as follows. The first relay coil 75 controls a double pointed contact breaker arm 80. The second relay coil 86 controls a single pointed contact breaker arm 89. The third relay coil 91 controls a single pointed contact breaker arm 93.

The current in the ignition circuit flows from the storage battery of the vehicle (not shown in Fig. 15) to the point 65 in the wiring diagram. The flow of ignition current is controlled by the ignition key 66. When this ignition key is switched on, depending on the position of the single-pole double-throw switch 73, current will flow to either one of the following circuits:

(i) The circuit 68, and thence to push button 12 of the Master Control; as well as to the double pointed contact breaker arm 80 of the first relay coil 75. As the points 81 are closed the current will then flow to the thermostat circuit 82, described below.

(ii) The circuit 74 and thus directly to the high voltage coil circuit 96.

The thermostat current commences at the upper point 81 and flows along the circuit 82. As indicated in the diagram, this circuit leads directly to the bimetallic thermostat 83. This thermostat is provided with a resistance heating element 78. The flow of current in this circuit is controlled by the action of the contact breaker arm 80 of the first relay coil 75.

The horn current commences at the upper point 84 and flows along the circuit 97 and thence to the main horn circuit of the vehicle. The flow of current in this circuit is controlled by the action of the bimetallic thermostat 83.

The high tension or high voltage coil current commences at the lower point 88 and flows to the high tension coil in the circuit 96. The current flow in this circuit is controlled by the action of the contact breaker arm 89 of the second relay coil 86. As stated above, current can also flow into this circuit from the ignition circuit 65 through the wire 74, depending on the position of the single-pole double-throw switch 73.

The circuit to the electrically operated hood lock commences at the lower point 94 and leads to the solenoid 95 of the electrically operated hood lock. The complete lock assembly is not shown in the wiring diagram. This circuit is controlled by the action of the contact breaker arm 93 of the third relay coil 91.

In addition to the five main circuits described above the following circuits leading to and from the Master Control are also shown in the wiring diagram.

In the ignition circuit leading to the Master Control, the current flowing in the ignition circuit 65 through the ignition switch 66 and the single-pole double-throw switch 73 flows to the Master Control through the circuit 68. In the wiring diagram the current flows to push button 12; though it can be made to flow to any other push button as desired. The current in this circuit cannot flow beyond the Master Control until push button 12 and the other specific push button 23 wired to the circuit is also pressed. This will be explained later. This circuit is controlled by the ignition key 66, the single-pole double-throw switch 73 and two specific push buttons 12 and 23 of the Master Control.

The current in the ignition circuit leading to the contact breaker arm of the first relay coil 75 flows in the circuit 65, through the ignition key 66 and the single-pole double-throw switch 73, through the circuit 68 and thence on to the double pointed contact breaker arm 80 of the first relay coil 75. The flow of current in this circuit is controlled by the ignition switch 66 and the single-pole double-throw switch 73.

The current in the circuit from the Master Control to the first relay coil 75 commences at push button 12 of the Master Control and flows to button 23 and along the wire 70 and thence to the first relay coil 75. The flow of current in this circuit is controlled by momentarily pressing push buttons 12 and 23 and not by merely pressing just either of these buttons.

The current in the energizing circuit of the first relay coil 75 commence at the lower point 79 and flows in the circuit 76 to energize the relay coil 75. The flow of current in the circuit is controlled by the action of the contact breaker arm 80.

The current in the circuit from the lower point of the first relay coil 75 to the Master Control for actuating the second relay coil 86 commences at the lower point 79 and flows to the junction 77 and in the wire 71 to push button 17 of the Master Control. The flow of current in this circuit is controlled by the action of the double pointed contact breaker arm 80 of the first relay coil 75 as current can only flow in this circuit when this contact breaker arm is pulled down and thus closes the points 79.

The current in the circuit from the lower point of the first relay coil 75 to the contact breaker arm of the second relay coil 86 commences at the lower point 79 and flows to the junction 77 and in the wire 85 to the single pointed contact breaker arm 89 of the second relay coil 86. The flow of current in this circuit is controlled by the action of the double pointed contact breaker arm 80 of the first relay coil 75.

The current in the circuit from the Master Control to the second relay coil 86 commences at push button 17 of the Master Control and flows to push button 9 and thence through the wire 69 to the second relay coil 86. The flow of current in this circuit is controlled by momentarily pressing push buttons 9 and 17 of the Master Control and not merely just either one of these buttons.

The current in the energizing circuit of the second relay coil 86 commences at the lower point 88 and flows in the circuit 87 to energize the second relay coil 86. The flow of current in this circuit is controlled by the action of the contact breaker arm 89.

The current in the circuit from the lower point of the first relay coil 75 to the Master Control for actuating the third relay coil 91 flows from the lower point 79 to the junction 77 and in the wire 67 and thence to push button 14 of the Master Control. The flow of current in this circuit is controlled by the action of the double point contact breaker arm 80 of the first relay coil 75.

The current in the circuit from the lower point of the first relay coil 75 to the contact breaker arm of the third relay coil 91 commences at the lower point 79 and flows to the junction 77 and in the wire 90 and thus to the single pointed contact breaker arm 93 of the third relay coil 91. The flow of current in this circuit is controlled by the action of the double pointed contact breaker arm 80 of the first relay coil 75.

The current in the circuit from the Master Control to the third relay coil 91 commences at push button 14 and flows to push button 5 of the Master Control and thence in the wire 72 to the third relay coil 91. The flow of current in this circuit is controlled by momentarily pressing push buttons 5 and 14 of the Master Control and not merely just either one of them.

The current in the energizing circuit of the third relay coil 91 commences at the lower point 94 and flows in the circuit 92 to energize the third relay coil 91. The flow of current in this circuit is controlled by the action of the contact breaker arm 93.

The functioning of the three relay coils and the operation of each of the circuits will be described in full. It will also be explained how the Master Control can be used to effectively prevent the current flowing through the ignition circuit from going directly to the high voltage coil circuit. This ensures that the engine of the vehicle cannot be started under any circumstances whatsoever.

Further, the flow of current halted by the Master Control can be diverted to the thermostat and the horn circuits, so as to ensure that the alarm sounding device functions automatically, and also when so desired to the high voltage coil, to start the engine, and/or to the circuit of the electrically operated hood lock in order to enable the solenoid to retract the bolt of this lock.

From the foregoing description it will be seen that the Master Control is the nerve center, as it were, which controls the ignition circuit, the circuit to the bimetallic thermostat and the electric circuit which operates the hood lock.

With regard to the role of the Master Control for controlling the ignition circuit, it is to be noted that the said Master Control is not intended to replace the ignition lock already existing on the vehicle but is so wired to the ignition circuit that when the ignition is switched on in the normal manner, by means of the ignition key, the current flows directly to an electrically operated thermostat 83 (Fig. 15).

When this thermostat heats up, in approximately 10 seconds, its points will close and complete an auxiliary circuit to the horns of the vehicle thereby causing the horns to sound continuously. The function of the Master Control is to control the flow of current in the circuit to the electrically operated thermostat, the ignition circuit between the ignition switch and the high voltage coil, and the circuit to the electrically operated hood lock.

As the Master Control is fitted with 24 push buttons, it provides 276 alternative two button combinations for controlling the flow of current in the above three circuits. This figure of 276 is obtained by using the formula $$\frac{N(N-1)}{2}$$

where "N" represents total number of push buttons which in this case is 24. The Master Control can also be used with advantage for controlling other electric circuits as well, such as those for any power operated device for raising the engine hood and/or car top, if so provided.

For ease of operation the Master Control is fitted in the instrument panel of the automobile or like motor vehicle, and in such a manner that only the top locking frame 37, top plastic cover plate 38 and the heads of the 24 plastic push buttons are visible as shown at 54 in Fig. 10. If so desired, the Master Control can also be mounted on a special bracket which can be attached to the steering column, and in such a manner that the said Master Control is within the easy reach of the driver. As the top cover plate 38 and the push buttons are made of plastic or like material they could be of any color to match the color scheme of the interior of the vehicle. Besides, the buttons and the top cover plate will not show any discoloration due to constant use, as would be the case if they were made of metal instead of being of plastic or like material. The Master Control will be located to the right of the steering column in a right hand drive vehicle and it will be to the left of the steering column in the case of a left hand drive vehicle.

In order to obviate the possibility of any unauthorized person discovering by touch which specific buttons operate the respective circuits, the tensions of the four corner springs 43 supporting the floating plate, the individual springs of the respective 18 broad based and 6 narrow based push buttons 41 and 35, respectively, and the springs of the plungers 32 in the 6 contact holder assemblies are all carefully chosen so that the overall tension of each of the 24 push buttons is the same and therefore indistinguishable by touch.

In order to ensure that any attempt made by an unauthorized person either to operate the ignition circuit or open the engine hood is almost immediately detected, the present invention incorporates an exclusive feature whereby the horns of the vehicle automatically commence to sound within a period of approximately 10 seconds from the time such an attempt is made. As the horns will keep on sounding continuously, the unauthorized person has no option other than to flee from the scene of action in order to escape being apprehended due to the attention focussed on the vehicle by the alarm caused by the continuous sounding of the horns.

As both by day or night, in a crowded thoroughfare or a private car park, an unauthorized person cannot hope to stealthily tamper with the vehicle without attracting attention, there would obviously be no possibility of the vehicle itself being driven away under such circumstances.

To provide an effective alarm sounding device as described above a simple electrically operated bimetallic type of thermostat 83 is wired to the ignition circuit 65. The flow of current from the ignition circuit 65 to this electrically operated thermostat is controlled by a specific pair from out of the 24 push buttons in the Master Control. The manner in which this thermostat functions so as to definitely cause the horns to sound continuously whenever any unauthorized person attempts to switch on the ignition key 66 or open the engine hood, and the action to be taken to prevent the sounding of the horns, is described below.

When the operator switches on the ignition key 66 in the normal manner, current will flow to the single-pole double-throw switch 73 specifically provided. This switch is installed on the dash board in the engine compartment as shown in Fig. 24.

The switch 73 can be turned to either one of two positions. In one position, such as, for example, the normal position shown in Fig. 15, the current will flow in the circuit 68 leading to the double pointed contact breaker arm 80 of the first relay coil 75. As this double pointed contact breaker arm is spring loaded with the tension upwards the upper pair of points 81 normally remains closed thereby causing the current to flow directly to the circuit 82 leading to the bimetallic thermostat 83.

In the other position of the switch 73, current will flow in the wire 74 directly to the high voltage coil circuit 96.

When the single-pole double-throw switch 73 is in the first-mentioned position, which is the normal position, the current will flow to the resistance 78 and commence to heat the thermostat 83. In approximately 10 seconds this thermostat will be sufficiently heated to cause its upper make-and-break arm to rise and thereby close the points 84 leading to the horn circuit 97. As soon as this happens the horns will sound continuously and cannot be silenced until the operator takes specific action that would prevent the horns from sounding.

An unauthorized person cannot succeed in attemping to silence the horns by tampering with the horn wires since the hood of the engine is locked.

As the initial act of merely switching on the ignition key will automatically cause the horns to sound in approximately 10 seconds, any unauthorized person would thereby be setting this alarm sounding device into operation himself, perhaps without quite realizing this fact. The only way to prevent the horns from sounding continuously would be to either switch off the ignition key or to momentarily press only those two specific push buttons, out of the 24, that control the flow of current to the first relay coil 75 and thereby break the thermostat circuit 82. For example, let these button numbers be 12 and 23. When these two buttons are pressed momentarily they complete a circuit within the Master Control that would cause the current which is already flowing to both the double pointed contact breaker arm 80 as well as the Master Control through the circuit 68, to the first also flow to relay coil 75 through the circuit 70. As soon as the current flows to this relay coil, said relay is energized, due to electro-magnetic action, it pulls down the double-pointed contact breaker arm 80 immediately above.

When this happens, the upper pair of points 81 opens breaking the thermostat circuit 82, thereby causing the points 84 to open and thus prevent the horns from sounding.

When, however, this double pointed contact breaker arm 80 is pulled downwards, apart from causing the upper pair of points 81 to open, it would close the lower pair of points 79 and would thus enable the current to flow in the four circuits 77. As these circuits are broken at this stage and can only be completed by pressing the specific push buttons that control the respective circuits, nothing further can happen as far as these four circuits are concerned. It is, however, important to note that the current will also flow to the first relay coil 75 by means of the circuit 76. Thus, though push buttons 12 and 23 are only momentarily pressed in order to energize relay coil 75 and cause the double pointed contact breaker arm 80 immediately above to be pulled down, this relay coil will continue to remain energized even after the push buttons 12 and 23 are released and return to their normal position. This condition will remain until the ignition switch 66 is turned off or the single-pole double-throw switch 73 is changed to its alternative position.

From the preceding paragraphs the functioning of the alarm sounding device may be briefly summarized as follows:

When the ignition switch 66 is turned on and the single-pole double-throw switch 73 is in its first position, the current will flow directly to the double pointed contact breaker arm 80 and thence to the thermostat circuit 82. When the thermostat 83 heats up in approximately 10 seconds its points 84 will close and cause the horns to sound continuously.

When the spicific pair of push buttons controlling the flow to relay coil 75 is momentarily pressed it would cause the relay coil to be energized and thereby pull down the double pointed contact breaker arm 80. This would cause the upper pair of points 81 to open and break the circuit to the thermostat and at the same time the lower pair of points 79 would close and cause current to flow in the four circuits 77 leading from the lower point as shown in the wiring diagram.

The current would also flow to relay coil 75 through the wire 76 and thus ensures that this relay coil continues to remain energized even after these two push buttons are released and returned to the normal position. Thus, the pressing of these two buttons breaks one circuit, i.e. the thermostat circuit 82, while at the same time it completes another circuit, namely the circuit 76, to relay coil 75 and thereby causes it to remain energized even when these two push buttons are released after being pressed only momentarily.

The mode of operation of an automobile or like vehicle fitted with the theft preventing device described above is as follows:

The correct sequence of action to start the engine without causing the horns to sound, and to open the engine hood when necessary, will now be described in detail along with an explanation of the functioning of this device at each stage of the operations.

The 3 relay coils of the Master Control, are located on the dash board of the engine compartment as shown at 111 in Figure 24.

To start the engine the ignition key 66 is turned on. The current will flow immediately in the thermostat circuit 82 and to the resistance 78 of the thermostat unit and will cause the horns to sound in approximately 10 seconds as described in the preceding paragraphs. The pair of buttons that controls the flow of current to relay coil 75, such as, for example, buttons Nos. 12 and 23 are momentarily pressed. The pressing of these two buttons immediately produces two results as described above. That is, they break the circuit to the thermostat and thus prevent the horns from sounding, and they complete the circuit to relay coil 75 through the wire 76 thereby causing this relay coil to remain energized and to hold down the double pointed contact breaker arm 80 even after the push buttons have been released.

Current will now also be flowing to the contact breaker arm 89 of relay coil 86 through the circuit 85 of Figure 15.

The pair of buttons controlling the flow of current to relay coil 86, such as, for example, buttons 9 and 17 is momentarily pressed. The pressing of these two buttons immediately produces two results. They complete a circuit within the Master Control whereby the current that is flowing to it from the lower set of points 79 of the first relay coil 75 through circuit 71 (Figure 15) also flows on to the second relay coil 86 through the circuit 69 and thereby causes the relay coil 86 to become energized and pull down its single pointed contact breaker arm 89.

When the single pointed contact breaker arm of the second relay coil 86 is pulled down the points 88 close and thus cause the current that is already flowing through the circuit 85 to flow to the high voltage coil circuit 96.

The current then flows through the circuit 87 and continues to energize the second relay coil 86. The engine is then ready to be started.

If the second pair of buttons (Nos. 9 and 17) is inadvertently pressed before the first pair of buttons (Nos. 12 and 23) has been pressed, the horns will not sound and the engine cannot be started, as the current will not flow to the high voltage coil. The reason for this is that the points 88 leading to the high voltage coil circuit can only close when the second relay coil 86 has been energized; and this relay coil can be energized only after the first relay coil is itself first energized and closes its lower set of points 79. As, therefore, the pressing of the second pair of buttons in the wrong sequence would only cause the first relay coil 75 to be energized and not the second relay coil 86 at this stage, all that has to be done is to merely press the second pair of buttons (Nos. 9 and 17) momentarily once again.

If the engine stalls, either during idling or when the vehicle is running, there is no need to engage either pair of buttons of the Master Control to restart the engine as the points 88 to the high voltage circuit will remain closed and current will continue to flow in this circuit. Once the ignition key has been turned off, however, as relay coils 75 and 86 would cease to be energized, all the circuits would be immediately opened as the respective points of these two relay coils will open. To start the engine, the foregoing procedure must be followed.

When the vehicle is to be serviced, repaired, or whenever so desired, and in order to avoid revealing the press button combinations for the various circuits, the engine can be started in the following manner:

The position of the single-pole double-throw switch 73 is changed from position 1 (to the thermostat circuit) to position 2 (to the high voltage coil circuit). As this switch is fixed to the dash board in the engine compartment it is only accessible by opening the engine hood. The engine can then be started in the normal way by merely switching on the ignition key. After the servicing or repair has been completed the position of the single-pole double-throw switch must be changed from position 2 back to position 1 in order to prevent the engine being started directly and without having to operate the Master Control.

To open the engine hood, the ignition key 66 is turned on. The specific pair of buttons (Nos. 12 and 23) that control the flow of current to the first relay coil 75 are momentarily pressed. The aforementioned operation will result. It is important to note that current will also be flowing from the lower pair of points 79 of the first relay coil 75 to the circuit 90 and thence to the contact breaker arm 93 of the third relay coil 91. The pair of buttons controlling the flow of current to the third relay coil 91 (for example, buttons Nos. 5 and 14) is momentarily pressed. The pressing of these two buttons would immediately produce two results. A circuit is completed within the Master Control whereby the current that is flowing to it from the lower set of points 79 of relay coil 75 through the circuit 67 flows to relay coil 91 through the circuit 72 and thereby causes this relay coil to be energized and thus pull down its single pointed contact breaker arm 93. When the single pointed contact breaker arm 93 is pulled down it closes the points 94 to the circuit leading to the solenoid 95 of the electrically operated hood lock and thereby causes the steel bolt of the lock to be retracted. In addition to closing these points, it also causes the current to flow to relay coil 91 through the circuit 92 and thus ensures that this relay coil remains energized even after the buttons Nos. 5 and 14 are released.

By this means the steel bolt of the hood lock would remain retracted, as required, even after push buttons Nos. 5 and 14 have been released.

The hood can now be opened in the normal manner.

Once the hood has been raised the ignition key can be turned off as the hood can be lowered and will be automatically locked when fully closed. This is made possible by the design of the drop arm assembly, for when the hood is lowered, bringing down with it the drop arm, the lower slanting end of the locking piece 98 would first come in contact with the rounded portion of the top of steel bolt 120 of the lock causing the locking piece to turn anticlockwise until such time as the tip of the locking piece gets under the bolt of the lock. When this happens, the locking piece will return to its normal horizontal position shown in Fig. 16 due to the tension of the spring 99. As the tension of this spring is weak, no damage will be caused either to the locking piece or the steel bolt of the lock.

In the event of any failure in the electrical circuit the hood can be opened by means of the emergency release 112. Whenever the engine hood is opened by this means it would cause the horns to sound due to spring catch 118 dropping into the slot 127 of the press switch 122 of the auxiliary horn circuit 123. The horns will sound continuously until the lock is returned to its normal position by releasing of the spring catch 118.

When the vehicle is to be serviced or repaired, or whenever so desired, and in order to avoid revealing the press button combinations to operate the hood lock, said lock can be rendered ineffective by loosening the winged butterfly nut 102 and pushing the lower part of the drop arm upwards in order to prevent the locking piece 98 of the drop arm engaging with the bolt of the lock. After the servicing or repair has ben completed the drop arm must be lowered to its full extent once again in order to prevent the hood from being opened freely in the absence of any locking device.

With the incorporation of these three main components; namely the Master Control, the alarm sounding device and the electrically operated hood lock this invention provides complete security against any attempt at theft of the vehicle. This is ensured by embodying the following exclusive features.

The ignition key must be first switched on in the normal manner whenever it is desired either to start the engine of the vehicle or to open the engine hood. Once the ignition key has been switched on the horns will sound continuously in approximately 10 seconds unless a specific pair of buttons of the Master Control is momentarily pressed. The horn circuit cannot be tampered with as the engine hood is locked. The use of the ignition key by any unauthorized person would, therefore, lead to his being apprehended instead of enabling him to either drive the vehicle away or to open the engine hood.

To start the engine, a second specific pair of buttons must be momentarily pressed. Until this is done the ignition circuit to the high voltage coil will not be completed and the engine cannot therefore be started under any circumstances whatsoever.

To open the engine hood a third specific pair of buttons of the Master Control must be momentarily pressed. Although the hood can be opened by means of the emergency release provided for the hood lock, this procedure, if adopted, would also cause the horns to sound continuously and thereby raise the desired alarm.

If at any time the driver of the vehicle experiences difficulty in remembering the six specific push buttons, from out of the 24, that operate the thermostat circuit, the circuit to the high voltage coil and the circuit to the electrically operated hood lock, the wiring within the Master Control can be very easily modified in a few minutes in order to enable these three circuits to be operated by using only three push buttons instead of the normal six. For example, buttons Nos. 12 and 23 would operate the thermostat circuit, Nos. 23 and 9 would operate the circuit to the high voltage coil and Nos. 12 and 9 would operate the circuit to the hood lock. This modification to the wiring is entirely optional and at the discretion of the owner of the vehicle; but will not in any way minimize the security afforded by this invention for the simple reason that nobody except the authorized driver of that particular vehicle will be aware of the modification to the wiring within the Master Control.

The effective alarm sounding device incorporated in this invention will definitely prevent any unauthorized person from venturing to discover the specific push buttons that operate the respective circuits.

As there is no visible indication on the Master Control, or any other means of identifying the specific button numbers that operate the various circuits, this knowledge is an abstract factor that exists only in the mind of the operator. It is, therefore, something that cannot be misplaced, stolen or duplicated; as would be the case if any concrete article like a metal key were to be used to operate the Master Control. Besides, as these button numbers for the various circuits can be easily changed as often as desired, and whenever it is suspected that they have been inadvertently revealed, there can be no better means of ensuring that the maximum degree of security afforded is maintained at all times, even if the ignition key is in the possession of any unauthorized person.

What I claim is:

1. In a device for preventing theft of an automotive vehicle, in combination a first electric circuit for operation of said vehicle; a second electric circuit adapted to actuate alarm means when closed; control means movable for initiating operation of the vehicle; switch means arranged in said first and said second circuit for simultaneously closing said first and opening said second circuit; circuit closing means arranged in said second circuit in series with said second switch means and operatively connected to said control means for closing said second circuit when said control means are moved; a plurality of switch actuating means having exposed portions of a predetermined appearance; and a plurality of additional actuating means having an exposed portion of an appearance indistinguishable from said predetermined appearance and operatively connected to said switch actuating means for rendering said switch actuating means inoperative for operation of said switch means.

2. In a device for preventing theft of an automotive vehicle, in combination, a first electric circuit for operation of said vehicle; a second electric circuit; actuating means in said second circuit for actuating alarm means when said second circuit is closed; control means movable for initiating operation of the vehicle; switch means arranged in said first and said second circuit for simultaneously closing said first and opening said second circuit; circuit closing means arranged in said second circuit in series with said second switch means and operatively connected to said control means for closing said second circuit when said control means are moved; a plurality of switch actuating means having exposed portions of a predetermined appearance; and a plurality of additional actuating means having an exposed portion of an appearance indistinguishable from said predetermined appearance and operatively connected to said switch actuating means for rendering said switch actuating means inoperative for operation of said switch means.

3. In a device for preventing theft of an automotive vehicle, in combination, a first electric circuit for operation of said vehicle; a second electric circuit; delayed actuating means in said second circuit for actuating alarm means after a predetermined delay when said second circuit is closed; control means movable for initiating operation of the vehicle; switch means arranged in said first and said second circuit for simultaneously closing said first and opening said second circuit; circuit closing means arranged in said second circuit in series with said second switch means and operatively connected to said control means for closing said second circuit when said control means are moved; and a plurality of switch actuating means having exposed portions of a predetermined appearance; and a plurality of additional actuating means having an exposed portion of an appearance indistinguishable from said predetermined appearance and operatively connected to said switch actuating means for rendering said switch actuating means inoperative for operation of said switch means.

4. In a device for preventing theft of an automotive vehicle, in combination, a first electric circuit for operation of said vehicle; a second electric circuit; electrically operated hood locking means in said second circuit; switch means respectively arranged in said first circuit and said second circuit; and a plurality of switch actuating means having exposed portions of a predetermined appearance; and a plurality of additional actuating means having an exposed portion of an appearance indistinguishable from said predetermined appearance and operatively connected to said switch actuating means for rendering said switch actuating means inoperative for operation of said switch means.

5. In a device for preventing theft of an automotive vehicle, in combination, an electric circuit for operation of said vehicle; normally open first switch means arranged in said circuit; a housing mounted on said vehicle; a plurality of normally open second switch means arranged in said circuit in series with said first switch means; a plurality of switch actuating means mounted on said housing and having exposed portions of a predetermined appearance, said actuating means operatively connected to said second switch means for closing the same; a support mounted on said housing for supporting said second switch means movable between a first position in which said switch means are in operative connection with said switch actuating means for closing the same, and a second position in which said operative connection is inoperative; biasing means mounted on said housing urging said support into said first portion; and additional actuating means mounted on said housing and having exposed portions of an appearance indistinguishable from said predetermined appearance, said additional actuating means operatively connected to said support for moving the same in said second position, whereby actuation of said additional actuating means will move said support into said second position thereof to prevent said second switch means from being closed and prevent passing of electric current through said first electric circuit.

6. In a device for preventing theft of a vehicle, in combination, an electric circuit for operation of said vehicle; normally open first switch means in said circuit; normally open second switch means arranged in said circuit in series with said first switch means; a housing mounted on said vehicle; switch actuating means operativley connected to said second switch means for closing the same mounted on said housing and having an exposed portion of a predetermined appearance; a support mounted on said housing for supporting said second switch means movable between a first position in which said switch means is in operative connection with said switch actuating means for closing the same, and a second position in which said operative connection is inoperative; biasing means mounted on said housing urging said support into said first position; and additional actuating means mounted on said housing and having exposed portions of an appearance indistinguishable from said predetermined appearance, said additional actuating means operatively connected to said support for moving the same into said second position, whereby actuation of said additional actuating means will move said support into said second position thereof to prevent said second switch means from being closed and passing of electric current through said electric circuit.

7. In a device for preventing theft of a vehicle, in combination, an electric circuit for operation of said vehicle; a second circuit; electrically operative hood locking means in said second circuit; additional normally open switch means in said second circuit; normally open first switch means in said first circuit; normally open second switch means arranged in said first circuit in series with said first switch means; a housing mounted on said vehicle; switch actuating means operatively connected to said second switch means for closing the same, mounted on said housing and having an exposed portion of a predetermined appearance; a support mounted on said housing for supporting said second switch means movable between a first position in which said switch means is in operative connection with said switch actuating means for closing the same, and a second position in which said operative connection is inoperative; biasing means mounted on said housing urging said support into said first position; and additional actuating means mounted on said housing and having exposed portions of an appearance indistinguishable from said predetermined appearance, said additional actuating means operatively connected to said support for moving the same into said second position, whereby actuation of said additional actuating means will move said support into said second position thereof to prevent said second switch means from being closed and passing of electric current through said first electric circuit.

8. In a device for preventing theft of a vehicle, in combination, an electric circuit for operation of said vehicle; control means movable for initiating operation of the vehicle; an additional circuit actuating an alarm when closed; circuit closing means arranged in said additional circuit in series with said second switch means and operatively connected to said control means for closing said additional circuit when said control means are moved; normally open first switch means in said circuit; normally open second switch means arranged in said circuit in series with said first switch means; a housing mounted on said vehicle; switch actuating means operatively connected to said second switch means for closing the same, mounted on said housing and having an exposed portion of a predetermined appearance; a support mounted on said housing for supporting said second switch means movable between a first position in which said switch means is in operative connection with said switch actuating means for closing the same, and a second position in which said operative connection is inoperative; biasing means mounted on said housing urging said support into said first position; and additional actuating means mounted on said housing and having exposed portions of an appearance indistinguishable from said predetermined appearance, said additional actuating means operatively connected to said support for moving the same into said second position, whereby actuation of said additional actuating means will move said support into said second position thereof to prevent said second switch means from being closed and passing of electric current through said electric circuit.

9. In a device for preventing theft of a vehicle, in combination, an electric circuit for operation of said vehicle; normally open first switch means in said circuit; normally open second switch means arranged in said circuit in series with said first switch means; control means movable for initiating operation of the vehicle; an additional circuit actuating an alarm when closed; circuit closing means arranged in said additional circuit in series with said second switch means and operatively connected to said control means for closing said additional circuit when said control means are moved; delay means in said additional circuit for actuating the alarm after a predetermined time delay when said additional circuit is closed; a housing mounted on said vehicle; switch actuating means operatively connected to said second switch means for closing the same, mounted on said housing and having an exposed portion of a predetermined appearance; a support mounted on said housing for supporting said second switch means movable between a first position in which said switch means is in operative connection with said switch actuating means for closing the same, and a second position in which said operative connection is inoperative; biasing means mounted on said housing urging said support into said first position; and additional actuating means mounted on said housing and having exposed portions of an appearance indistinguishable from said predetermined appearance, said additional actuating means operatively connected to said support for moving the same into said second position, whereby actuation of said additional actuating means will move said support into said second position thereof to prevent said second switch means from being closed and passing of electric current through said electric circuit.

10. In a device for preventing theft of a vehicle, in combination, an electric circuit for operation of said vehicle; a second circuit; electrically operative hood locking means in said second circuit; additional normally open switch means in said second circuit; normally open first switch means in said first circuit; normally open second switch means arranged in said first circuit in series with said first switch means; control means movable for initiating operation of the vehicle; an additional circuit actuating an alarm when closed; circuit closing means arranged in said additional circuit in series with said second switch means and operatively connected to said control means for closing said additional circuit when said control means are moved; delay means in said additional circuit for actuating the alarm after a predetermined time delay when said additional circuit is closed; a housing mounted on said vehicle; switch actuating means operatively connected to said second switch means for closing the same, mounted on said housing and having an exposed portion of a predetermined appearance; a support mounted on said housing for supporting said second switch means movable between a first position in which said switch means is in operative connection with said switch actuating means for closing the same, and a second position in which said operative connection is inoperative; biasing means mounted on said housing urging said support into said first position; and additional actuating means mounted on said housing and having exposed portions of an appearance indistinguishable from said predetermined appearance, said additional actuating means operatively connected to said support means for moving the same into said second position, whereby actuation of said additional actuating means will move said support into said second position thereof to prevent said second switch means from being closed and passing of electric current through said first electric circuit.

11. In a device for preventing theft of a vehicle, in combination, an electric circuit for operation of said vehicle; normally open first switch means in said circuit; normally open second switch means arranged in said circuit in series with said first switch means; a housing mounted on said vehicle; manually operated switch actuating means operatively connected to said second switch means movable to and from a closing portion for closing said second switch means, mounted on said housing and having an exposed portion of a predetermined appearance; normally open third switch means in said circuit; holding relay means operatively connected to said first switch means, said second switch means and said third switch means for closing said third switch means upon closure of said second switch means until said first switch means are opened; biasing means mounted on said housing permanently urging said switch actuating means from said closing position thereof; a support mounted on said housing for supporting said second switch means movable between a first position in which said switch means is in operative connection with said switch actuating means for closing the same, and a second position in which said operative connection is inoperative; additional actuating means mounted on said housing and having exposed portions of an appearance indistinguishable from said predetermined appearance, said additional actuating means operatively connected to said support for moving the same into said second position, whereby actuation of said additional actuating means will move said support into said second position thereof to prevent said second switch means from being closed and passing of electric current through said electric circuit.

References Cited in the file of this patent

UNITED STATES PATENTS

| | | |
|---|---|---|
| 1,293,510 | Moores | Feb. 4, 1919 |
| 2,101,429 | DeFelice | Dec. 7, 1937 |
| 2,517,619 | Ainley | Aug. 8, 1950 |
| 2,802,198 | Poludniak | Aug. 6, 1957 |
| 2,843,843 | Davis | July 15, 1958 |